United States Patent [19]

Linss et al.

[11] Patent Number: 4,808,105
[45] Date of Patent: Feb. 28, 1989

[54] APPARATUS FOR MANUFACTURING A PLASTIC HOLLOW BODY WHICH HAS A SLIDABLE MANDREL

[75] Inventors: Gerhard Linss; Karl-Friedrich Ossberger, both of Weissenburg, Fed. Rep. of Germany

[73] Assignee: Ossberger Turbinenfabrik GmbH & Co., Weissenburg, Fed. Rep. of Germany

[21] Appl. No.: 154,360

[22] Filed: Feb. 10, 1988

[30] Foreign Application Priority Data

Feb. 12, 1987 [DE] Fed. Rep. of Germany ....... 3704265

[51] Int. Cl.$^4$ ............................................ B29C 49/06
[52] U.S. Cl. .................... 425/529; 215/1 C; 264/537; 425/533; 428/36.9; 428/36.92
[58] Field of Search .................... 428/35, 36; 215/1 C; 425/503, 522, 528, 529, 532, 533, 566, 466; 264/537, 539

[56] References Cited

U.S. PATENT DOCUMENTS

| | | | |
|---|---|---|---|
| 2,908,034 | 10/1959 | Hackett | 264/539 |
| 3,032,810 | 5/1962 | Soubier | 264/539 |
| 3,288,898 | 11/1966 | West | 425/528 X |
| 3,394,209 | 7/1968 | Cheney | 264/533 X |
| 3,855,380 | 12/1974 | Gordon et al. | 425/533 X |
| 4,188,179 | 2/1980 | Linss et al. | 425/532 X |
| 4,406,854 | 9/1983 | Yoshino | 425/529 X |

FOREIGN PATENT DOCUMENTS 2528029  1/1977  Fed. Rep. of Germany ...... 425/528

*Primary Examiner*—Richard L. Chiesa
*Attorney, Agent, or Firm*—Holman & Stern

[57] ABSTRACT

An apparatus is disclosed that is intended for manufacturing a hollow body. The hollow body has a head piece formed by blow-molding a preform segment. The apparatus includes a ring-shaped nozzle, a withdrawal device, and blow-mold pieces which are laterally, reciprocally movable. Regions of the hollow body are fabricated to have outer diameters which are less than the diameter of the extruded tubular segment before the segment is blow-molded. This is achieved by a reciprocally movable mandrel with a molding extension. The molding extension extends both radially and inwardly between projecting regions of the closed blow-mold pieces. The projecting regions of the blow-mold pieces press the corresponding parts of the preform segment against the molding extension, wherewith the ring-shaped nozzle opening is radially, outwardly offset with respect to the outer contour of the molding extension. Following the extrusion, the molding extension is advanced downward, in the embodiment illustrated, and serves as an implement for forming the inner shape of the reduced-diameter region or regions of the body part, and as an opposing thrust element for the blow-mold pieces which press together a region or regions of the tubular preform segment.

10 Claims, 3 Drawing Sheets

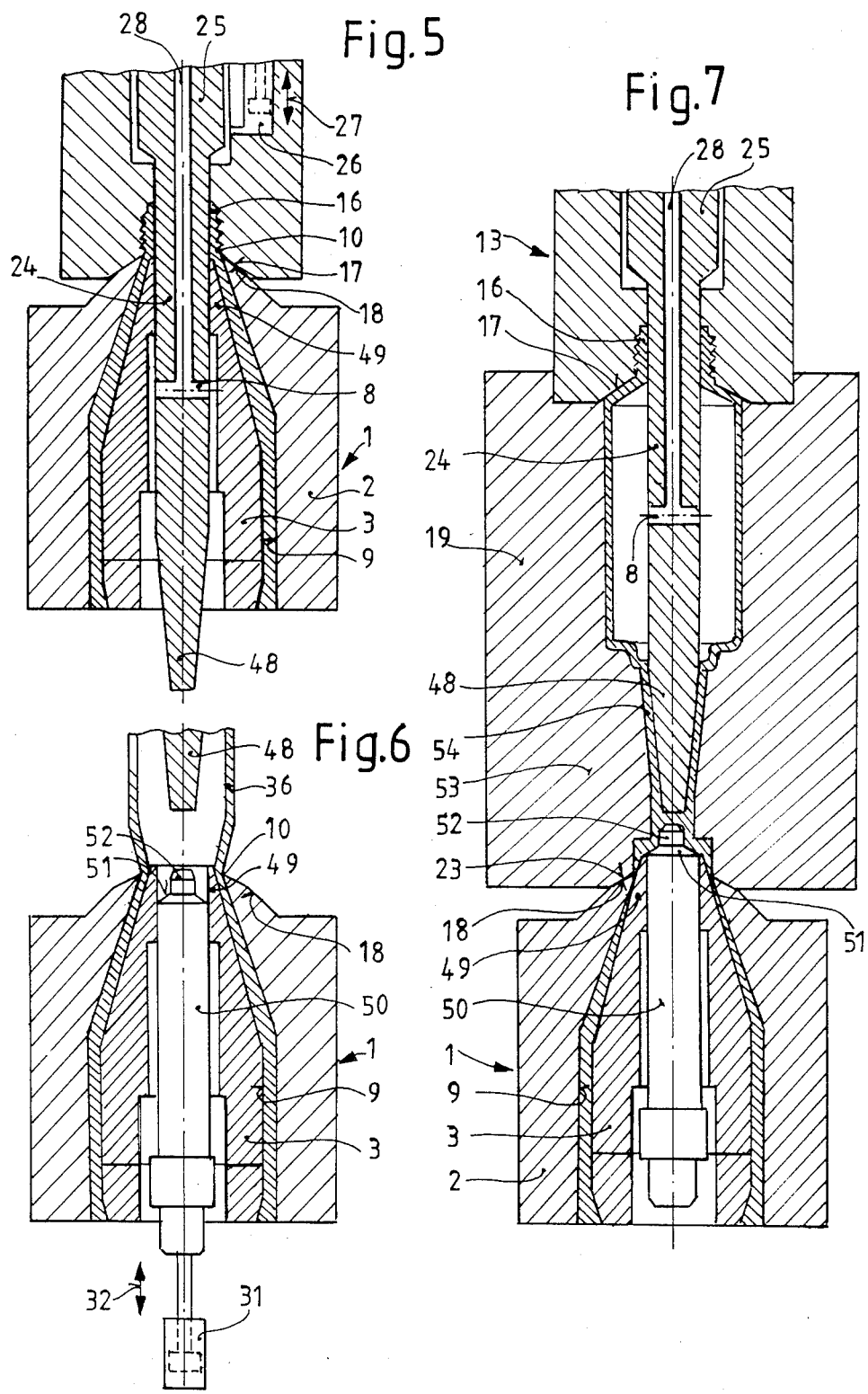

APPARATUS FOR MANUFACTURING A PLASTIC HOLLOW BODY WHICH HAS A SLIDABLE MANDREL

BACKGROUND OF THE INVENTION

The invention relates to an apparatus for manufacturing a hollow body comprised of thermoplastic material, which hollow body has a head piece formed by injection molding, has a body part comprised of a preform segment integrally joined to said head piece, and possibly has a bottom member formed by press-forming of the preform segment, wherewith the subject apparatus is comprised of a ring-shaped nozzle wherein a nozzle cone piece and a nozzle opening piece define a ring-shaped nozzle opening, said apparatus being further comprised of a withdrawal device with a recess which withdrawal device is axially reciprocally movable with respect to the ring-shaped nozzle, and said apparatus being further comprised of a blow mold having a plurality of blow-mold pieces which are laterally reciprocally movable.

In a known apparatus of this type (Ger. Pat. No. 2,528,029), the preform segment undergoes press forming with participation of the bottom elements of the blow-mold pieces only for forming the bottom member of the hollow body, and is then blow molded, wherewith the outer edge of the opening of the recess which opening faces the ring-shaped nozzle (which outer edge is also the outer edge of the head piece cavity of the recess) is configured and positioned such that it bounds the ring-shaped nozzle opening and closes it off, and the ring-shaped nozzle opening is flush with the radial boundary of the tubular preform segment prior to the blow molding of said preform segment. There are numerous configurations of body parts of hollow bodies which cannot be manufactured by such an apparatus.

SUMMARY OF THE INVENTION

It is an object of the invention to devise an apparatus of the type described initially supra, wherein the outer diameter of the body part of the fabricated hollow body is in places smaller than the diameter of the extruded (un-blow-molded) tubular segment. This object is achieved by the inventive apparatus which is characterized in that a reciprocally movable mandrel with a molding extension is provided which extends between radially inwardly projecting regions of the closed blow-mold pieces, which inwardly projecting regions of the blow-mold pieces press the corresponding parts of the preform segment against said molding extension, wherewith (as a feature of the inventive apparatus) the ring-shaped nozzle opening is radially outwardly offset with respect to the outer contour of the molding extension.

Following the extrusion, the molding extension is advanced downward, and serves as an implement for forming the inner shape of the reduced-diameter regions of the body part, and as an opposing thrust element for the blow-mold pieces which radially press together a region or regions of the tubular preform segment. When the blow-mold pieces are moved together, their radially inwardly projecting regions press the preform radially inwardly against the molding extension. Thus, the outer diameter of the preform is reduced in that region, and is not blown outward. The molding extension can be inserted from the withdrawal device or from the ring-shaped nozzle. It determines the wall thickness and the bottom thickness.

It is particularly advantageous if the reciprocally movable mandrel comprises the blowing device with blow openings. The mandrel serves to move and position the molding extension, and is also integrated into the blowing means.

It is further particularly advantageous if the molding extension is installed opposite i.e., to function oppositely to a reciprocally movable plunger, wherewith a region of the preform can be pressed between the free ends of the molding extension and plunger, respectively. The extruded preform may also undergo press-forming in the direction.

It is also particularly advantageous if the molding extension is provided on the withdrawal device and the plunger is provided on the ring-shaped nozzle. In this way a hollow body can be produced which is closed on the bottom and open on the top (to allow penetration of the molding extension).

It is particularly advantageous also if the molding extension projects axially even when the withdrawal device rests on the ring-shaped nozzle, wherewith the molding extension extends into one of said devices. Thus, if the molding extension is mounted on the withdrawal device, it extends into the ring-shaped nozzle; and if mounted on the ring-shaped nozzle, it extends into the withdrawal device. Accordingly, it not necessary to provide drive means to retract the molding extension into the device on which it is mounted.

Prior to the blowing, an additional forming operation is performed on the preform segment, to additionally prepare the preform for conversion to a specially configured hollow body, which according to the state of the art can only be such as can be produced by extrusion from the nozzle opening and by blow-molding into the blow mold. As a result of the offset of the nozzle opening with respect to the other parts of the apparatus (which offset is unknown in known apparatuses), special configurations of the preform segment can be produced prior to the blowing.

A second object of the invention is to devise an apparatus of the type described initially supra, whereby a hollow body can be produced having a body part one end of which is flush with the outer edge of the head piece and the other end of which is blown. This object is achieved according to the invention by an apparatus which is characterized in that the ring-shaped nozzle opening is radially inwardly offset with respect to the outer edge of the opening of the recess which (latter) opening faces the ring-shaped nozzle, the closed blow-mold pieces leave free the region of the said recess opening which radially extends outward beyond the nozzle opening.

An injection-molded head piece is produced. Its diameter on its part directed toward the ring-shaped nozzle is greater than the diameter of the pressed i.e., extruded tubular preform segment. The preform segment is blown, as is customary, to provide a thin wall and to save plastic. For given desired diameters of the head piece and the hollow body, the inventive difference in transverse, radial dimensions enables a more substantial widening of the body part to be achieved in the blowing operation. The blown region of the preform segment adjoins the injection-molded head piece and is fused to it. The exterior of the blow region of the preform segment is hot enough (without additional measures being employed) that is will solidly fuse with the injection-molded head piece; the forces developed by the blowing of the preform segment are sufficient to effect this fusing-together.

It is particularly advantageous if the inner wall surface of the closed blow-mold pieces adjoins the outer edge of the recess opening of the recess, which opening is directed toward the ring-shaped nozzle. In some hollow bodies, e.g. weapons cartridges, the outer diameter of the body part is equal to the outer diameter of the injection-molded head piece. The blowing is then carried out with the result of reduction of the wall thickness of the tubular region of the preform segment.

It is further particularly advantageous (in a different embodiment) if the the inner wall of the closed blow-mold pieces is at a distance from the outer edge of the ring-shaped nozzle opening. A bottomless hollow-body body part is formed wherein the tubular region of the preform segment is disjoint from lit., "freed from" the nozzle opening, due to the fact that the plastic is severed and blown. The outer diameter of the body part beween the withdrawal device and the ring-shaped nozzle can be larger than the diameter of the nozzle opening.

It is also particularly advantageous if, when the withdrawal device rests on the ring-shaped nozzle, a ring-like extension of i.e., from the ring-shaped nozzle extends into the recess of the withdrawal device, and if a narrow extension e.g. a blow nozzle on the withdrawal device extends into the said ring-like extension of the ring-shaped nozzle. The use of this ring-like extension from the ring-shaped nozzle and this narrow extension from the withdrawal device enables recesses and the like to be produced in the head piece, whereby material is saved. Because the distance in the radial sense between the laterally outer part of the extension (on the ring-shaped nozzle) and the inner edge of the nozzle opening is very small, when the tubular preform is being extruded the said extension (on the ring-shaped nozzle) is retracted; in this way, the preform cannot adhere to the said extension. A ring-shaped wall of the head piece is produced between the narrow extension (on the withdrawal device) and the ring-like extension (on the ring-shaped nozzle) (see FIG. 2).

It is particularly advantageous also if, during extrusion, the ring width of the ring-shaped nozzle opening is at most equal to the transverse distance between the outer edge of the nozzle opening and the outer edge of the opening in the recess on the withdrawal device, which latter opening faces the ring-shaped nozzle. This dimensioning gives satisfactory savings of plastic while producing a firm fusion where the head piece and body piece join.

BRIEF DESCRIPTION OF THE DRAWINGS

FIG. 5 is a vertical cross sectional view of essential parts of a third inventive apparatus for manufacturing a plastic hollow body, said apparatus being in a first operating position;

FIG. 6 shows the apparatus of FIG. 5, in a second operating position; and

FIG. 7 shows the apparatus of FIG. 5, in a third operating position.

DETAILED DESCRIPTION OF THE INVENTION

Figure 1:
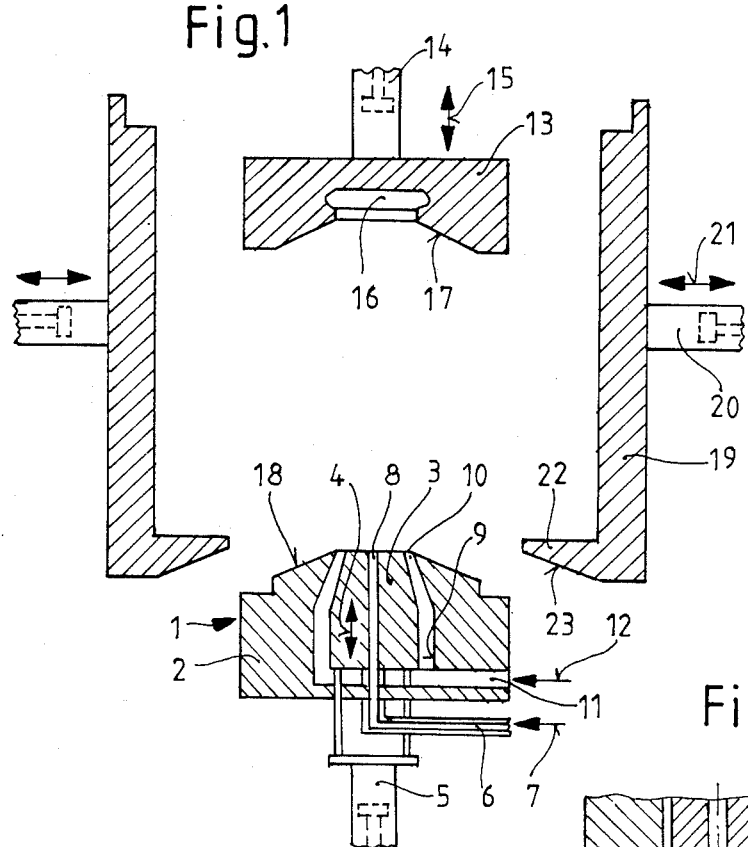
FIG. 1 is a schematic vertical cross section of an inventive apparatus for manufacturing a plastic hollow body.

The apparatus according to FIG. 1 comprises a ring-shaped nozzle 1 which is comprised of a fixed nozzle piece 2 in which a nozzle cone piece 3 is reciprocally movable (arrows 4) by a piston and cylinder device 5. Compressed air is supplied to the cone piece 3 via a tube 6 (arrow 7); this air is expelled from the cone piece 3 at the top, through a centrally disposed blow opening 8. The cone piece 3 and nozzle piece 2 define between them a ring-shaped channel 9 the upper end of which is a ring-shaped nozzle opening 10. Thermoplastic plastic material is fed to channel 9 from below via a tube 11 (arrow 12). Near the nozzle opening 10, the cone angle of the cone piece 3 is smaller than the cone angle of the inner surface of the nozzle piece, wherewith the nozzle opening 10 is closed off if the cone piece 3 is advanced upward.

A withdrawal device 13 is provided above the ring-shaped nozzle 1, which device 13 is reciprocally movable (arrows 15) by a piston and cylinder device 14. The underside of device 13 has a recess 16 which has an undercut and/or form-interlocking configuration (not illustrated) whereby the device 13 is separable and reassemblable. The withdrawal device 13 has a radially sic obliquely inclined support surface 17 which has a ring shape when viewed axially. The nozzle piece 2 has a matching end face 18 to the surface 17.

On both lateral sides of the ring-shaped nozzle 1 and withdrawal device 13 a blow-mold piece (19, 19) of a two-piece blow mold is provided. The pieces 19 are each reciprocally movable (arrows 21) by a respective piston and cylinder device 20. Each blow-mold piece 19 has a bottom member 22 having an inclined support surface 23 which can rest on the seat surface 18 of the nozzle piece 2.

Figure 2:
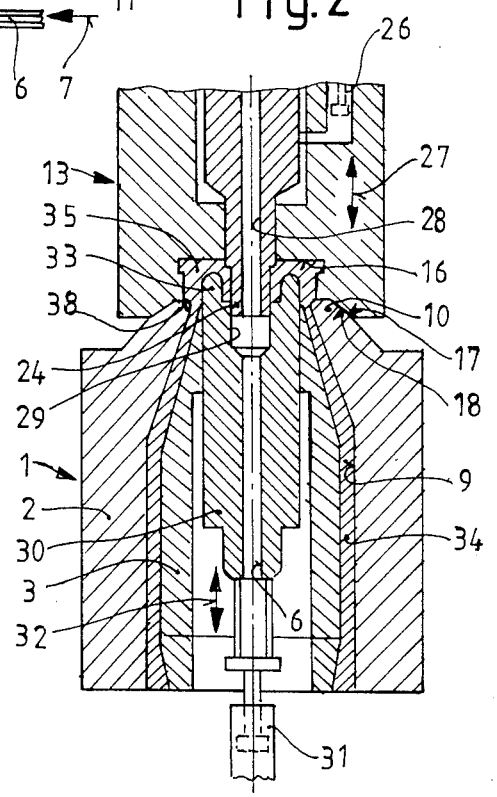
FIG. 2 is a vertical cross sectional view of essential parts of a second inventive apparatus for manufacturing a plastic hollow body, said apparatus being in a first operating position.
Figure 4:
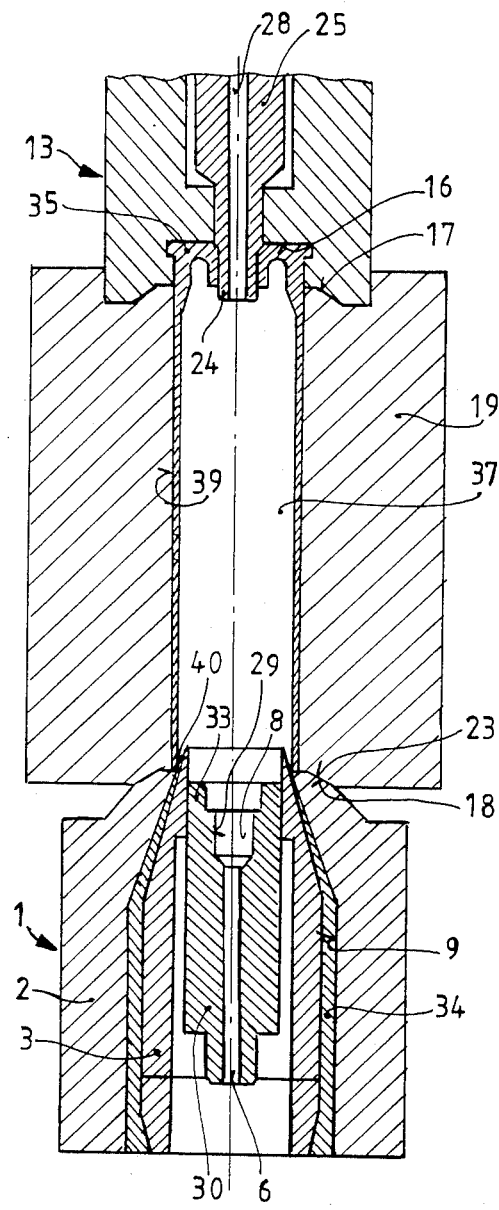
FIG. 4 shows the apparatus of FIG. 2, in a third operating position.
Figure 3:
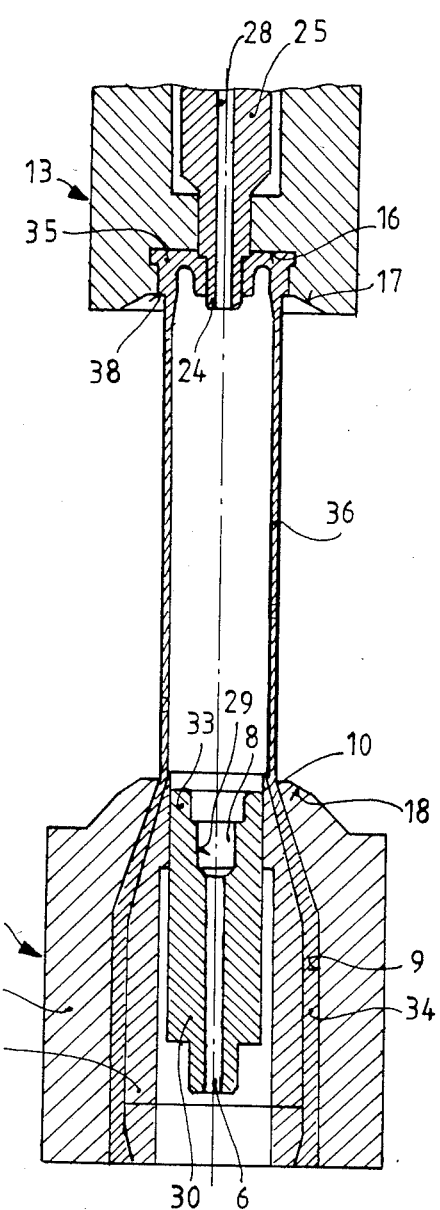
FIG. 3 shows the apparatus of FIG. 2, in a second operating position.

The apparatus of FIGS. 2–4 has a largely similar structure to that of FIG. 1; accordingly the same reference numerals and description apply, mutatis mutandis. The differences will be described. These include a blow nozzle 24 on the withdrawal device 13, which nozzle 24 extends into the middle of the recess 16 and further toward the ring-shaped nozzle 1. The blow nozzle 24 has a staged (offset) configuration in the recess 16, and is disposed on a tube 25 which is reciprocally movable (arrows 27) by a piston and cylinder device 26. Compressed air is passed via a bore 28 into the tube 25 and blow nozzle 24. Thus in this embodiment the blowing air is fed both from the withdrawal device 13 and from the ring-shaped nozzle 1. When the withdrawal device 13 rests on the ring-shaped nozzle 1 (FIG. 2), the blow nozzle 24 extends into a bore 29 in the ring-shaped nozzle 1, without entirely occupying said bore 29 in its axial extent. The blow nozzle 24 inserted in the bore 29 serves to block blow opening 8 during injection i.e., injection-molding.

In the apparatus according to FIGS. 2–4, the cone piece 3 accommodates a mandrel 30 which is reciprocally movable (arrows 32) by a piston and cylinder device 31, and has tube 6 disposed in it which runs to the blow opening 8. The upper part of mandrel 30 bears a ring-shaped projection 33 which extends into recess 16 and accommodates blow nozzle 24 (FIG. 2). According to FIG. 2, thermoplastic plastic 34 is injected through nozzle opening 10 into recess 16 to form a head piece 35. Then, according to FIG. 3, a tubular preform segment 36 is withdrawn i.e., extruded, with the nozzle opening 10 being partly closed i.e., reduced by upwardly advancing the cone piece 3. According to FIG. 4 the plastic in the nozzle opening 10 is severed, by fully upwardly advancing the cone piece 3 which has a conical surface having a smaller cone angle than the cone anlge of the inner surface of the nozzle piece 2. The blow-mold pieces 19 are moved against the withdrawal device 13 and the ring-shaped nozzle 1, and the preform segment is blown against the blow-mold pieces 19 to form a body part 37 of a hollow body.

As may be seen from FIG. 2, the width of the opening of the recess 16 facing the ring-shaped nozzle 1 is not fully covered by the ring-shaped nozzle opening 10. Accordingly, there is a radial ridge ("offset") 38 representing the difference between the outer edge sic—evidently means "lower outer edge" of the recess opening (16) and the (lesser diameter) ring-shaped nozzle opening 10. This region (38) not covered by the nozzle opening 10 is covered by the nozzle piece 2. According to FIG. 3, the region of the ridge 38 does not have an adjoining preform segment. However, according to FIG. 4, when the blowing takes place the adjoining preform segment does lie i.e. comes to lie against the ridge region 38, which ridge region is left free by the blow-mold pieces 19. The inner surface 39 of the blow mold adjoins the outer edge of the recess opening, so that there is a merging (matching) of the cylindrical shapes of the head piece 35 and the body part 37. The body part 37 is cylindrical down to the ring-shaped nozzle 1, because the body part 37 has been separated from the closed nozzle opening, and the inner surface of the closed blow-mold pieces is at a distance 40 from the cone piece 3 and the nozzle opening 10.

The apparatus according to FIGS. 5-7 is largely similar to that of FIG. 1; accordingly the same reference numerals and description apply, mutatis mutandis. The differences will be described. These include the fact that the lit., "a" tube in the withdrawal device 13 is reciprocally movable (arrows 27) by a piston and cylinder device 26. A blow nozzle member 24 is provided, as an extension on the tube 25, which member 24 extends not merely out of the recess 16 but (FIG. 5) into the ring-shaped nozzle 1 and an appreciable distance into the cone piece 3. A compressed air bore 28 has lateral openings 8, and there is a molding extension 48 on the blow nozzle member 24 which extension extends deep into the ring-shaped nozzle 1 (FIG. 5). The diameter of the molding extension 48 is appreciably less than the inner diameter of the ring-shaped nozzle opening 10, and the transverse cross sectional area of said extension 48 decreases with progression in the downward direction (toward the ring-shaped nozzle 1).

Accordingly, there is a radial difference between the inner edge of the ring-shaped nozzle opening 10 and the outer surface of the molding extension 48. In the region nearest the ring-shaped nozzle 1, of the blow-mold pieces 19, there are projecting zones 53, which, when the blow mold is closed (FIG. 7), terminate slightly short of the outer surface of the molding extension 48. A plunger member 50 is provided coaxial to the extension 48. Plunger 50 is associated with the ring-shaped nozzle 1, and is reciprocally movable (arrows 32) over a substantial distance, by means of a piston and cylinder device 31. The end face 51 of plunger 50 bears a molding extension 52. Plunger 50 with extension 52 is advanced upward and out of the ring-shaped nozzle 1, according to FIGS. 6-7.

According to FIG. 5, thermoplastic plastic material 34 is injected through the fully open nozzle opening 10 into the recess 16, whereby a head piece 35 is formed. The molding extension 48 disposed on the blow nozzle 24 penetrates deep into the ring-shaped nozzle 1, and the withdrawal device 13 rests on the ring-shaped nozzle 1. According to FIG. 6, the withdrawal device is moved upward ("away") with the nozzle opening 10 being partially open, i.e. with the cone piece 3 of the ring-shaped nozzle 1 being partially advanced (upward). In the process, a tubular preform segment 36 is extruded also means "withdrawn". The molding extension 48 is i.e., remains disposed in the region of said preform segment 36 which is close to lit., "directed toward" the ring-shaped nozzle 1; the lower end of extension 48 is only a short distance from the ring-shaped nozzle 1. According to FIG. 6, the plunger 50 is also advanced (upward), whereby the end face 51 lit., "1" and the molding extension 52 are disposed a short distance below the upper end face of the cone piece 1. Then (FIG. 7), the nozzle opening 10 is closed by further advancing the cone piece 3 (upward). In the process, the plastic 34 is severed. The blow-mold pieces 19 are moved together, whereby the projection zones 53 of the parts 19 press the corresponding region of the preform segment 36 against the molding extension 48, to form a press-formed shell i.e., nipple 54 having an outer diameter which is less than that of the ring-shaped nozzle, and having a wall thickness which is greater than that of the preform segment 36. The plunger 50 is further advanced (upward), whereby the plastic disposed between the end of the molding extension 48 and the end face of the plunger is press-formed as well.

We claim:

1. An apparatus for manufacturing a hollow body of thermoplastic plastic material,
    said boy having a head piece formed by injection molding and a body member formed by blow-molding, and a tubelike preform segment, said segment being integral with the head piece, comprising:
    a ring-shaped nozzle with a ring-shaped nozzle opening between a nozzle cone piece and a nozzle opening piece;
    a withdrawal device operative with respect to the ring-shaped nozzle, said withdrawal device being axially, reciprocally moveable and having a recess for forming the head piece;
    a blow mold with a plurality of blow mold pieces which are disposed laterally of said ring-shaped nozzle and said withdrawal device and are laterally, reciprocally movable, in order to form the closed blow mold between said ring-shaped nozzle and said retracted withdrawal device;
    a reciprocally movable mandrel with a molding extension, said molding extension extends between regions of said blow mold pieces;
    wherein walls of said closed blow mold pieces each have regions which project radially, inwardly with respect to the remainder of the respective walls; and
    wherein said ring-shaped nozzle opening is radially, outwardly offset with respect to the outer contour of said molding extension;

whereby said mandrel with said molding extension extends between said closed blow mold pieces when said blow mold is closed;

said radially, inwardly projecting wall regions of said closed blow mold pieces are structurally coordinated with said molding extension;

said molding extension is in the form of a forming molding implement for forming the interior configuration of a body part region having reduced diameter; and when said blow mold pieces are in said closed configuration said inwardly projecting wall regions press said preform against said molding extension.

2. An apparatus according to claim 1 where said reciprocally movable mandrel comprises said blowing device with blow openings.

3. An apparatus according to claim 1 wherein said molding extension is installed opposite a reciprocally movable plunger and wherein a region of said preform can be press-formed between free ends of said molding extension and plunger, respectively.

4. An apparatus to claim 1 wherein said molding extension projects axially even when said withdrawal device rests on said ring-shaped nozzle and wherein said molding extension extends into one of said withdrawal device or said ring-shaped nozzle.

5. An apparatus according to claim 1 wherein said ring-shaped nozzle opening is radially, inwardly offset with respect to said outer edge of the opening of said recess which latter opening faces said ring-shaped nozzle, and the closed blow-mold pieces leave free said region of said recess opening facing ring-shaped nozzle.

6. An apparatus according to claim 5 wherein said inner wall of said closed blow-mold pieces adjoins said outer edge of said opening of said recess, said opening faces said ring-shaped nozzle.

7. An apparatus according to claim 6 wherein that the inner wall of the closed blow-mold pieces is separated at a radial distance from the outer edge of the ring-shaped nozzle opening.

8. An apparatus for manufacturing a hollow body from thermoplastic plastic material, said hollow body having an injection-molded head piece, a body part formed by blow molding, a preform segment, said segment being integral with said head piece, and, optionally, a bottom member formed by press-forming said preform segment, comprising a ring-shaped nozzle wherein a ring-shaped nozzzle opening is defined a nozzle cone piece;

a withdrawal device operative with respect to the ring-shaped nozzle, said withdrawal device being axially, reciprocally movable;

a reciprocally movable mandrel with a molding extension is provided which extends between radially, inwardly projecting regions of said closed blow-mold pieces, said inwardly projecting regions of said blow-mold pieces press said corresponding parts of said preform segment against said molding extension, wherein said ring-shaped nozzle opening is radially outwardly offset with respect to the outer contour of the molding extension;

said molding extension being installed opposite a reciprocally movable plunger, wherein a region of said preform can be press-formed between said free ends of said molding extension and plunger, respectively;

said molding extension being provided on said withdrawal device and said plunger being provided on the ring-shaped nozzle.

9. An apparatus for manufacturing a hollow body from thermoplastic plastic material, said hollow body having an injection-molded head piece, a body part formed by blow molding, a preform segment, said segment being integral with said head piece, and, optionally, a bottom member formed by press-forming said preform segment, comprising:

a ring-shaped nozzle wherein a ring-shaped nozzle opening is defined between a nozzle cone piece and a nozzle opening piece;

a withdrawal device operative with respect to the ring-shaped nozzle, said withdrawal device being axially, reciprocally movable and having a recess;

a blow mold with a plurality of blow mold pieces which are laterally reciprocallly movable;

a reciprocally movable mandrel with a molding extension is provided which extends between radially, inwardly projecting regions of said closed blow-mold pieces, said inwardly projecting regions of said blow-mold pieces press said corresponding parts of said preform segment against said molding extension, wherein said ring-shaped nozzle opening is radially outwardly offset with respect to the outer contour of the molding extension;

said ring-shaped nozzle opening is radially, inwardly offset with respect to said outer edge of said opening of said recess, said latter opening faces said ring-shaped nozzle, and said closed blow-mold pieces leave free said region of said recess opening which radially extends outward beyond said nozzle opening;

said inner wall of said closed blow-mold pieces adjoins said outer edge of said opening of said recess, said opening faces said ring-shaped nozzle;

when said withdrawal device rests on said ring-shaped nozzle, a ring-shaped extension extends from said ring-shaped nozzle into said recess of said withdrawal device into said ring-shaped extension.

10. An apparatus according to claim 9 wherein, during extrusion, a ring width of the ring-shaped nozzle opening is at most equal to a transverse, radial distance between the outer edge of said nozzle opening and said outer edge of said opening in said recess on said withdrawal device, said latter opening faces the ring-shaped nozzle.

* * * * *